United States Patent [19]

Verhoeven

[11] 3,721,904

[45] March 20, 1973

[54] FREQUENCY DIVIDER

[75] Inventor: Leonardus Adrianus Johannes Verhoeven, Emmasingel, Eindhoven, Netherlands

[73] Assignee: U.S. Philips Corporation, New York, N.Y.

[22] Filed: Feb. 22, 1971

[21] Appl. No.: 117,360

[30] Foreign Application Priority Data

March 7, 1970 Netherlands ........................7003278

[52] U.S. Cl. .......................328/39, 328/55, 328/109, 307/225

[51] Int. Cl. .............................................H03k 23/24

[58] Field of Search.........178/5.4 P; 307/225 R, 225, 307/295; 328/39, 14–20, 25, 30, 39–52, 55

[56] References Cited

UNITED STATES PATENTS

| | | | |
|---|---|---|---|
| 3,327,226 | 6/1967 | Nourney | 328/109 |
| 3,196,358 | 7/1965 | Bagley | 328/55 |
| 3,341,693 | 9/1967 | Hurst | 328/46 |
| 3,200,340 | 8/1965 | Dunne | 328/110 |
| 2,487,191 | 11/1949 | Smith, Jr. | 328/39 |
| 2,882,404 | 4/1959 | Denton | 307/225 R |
| 2,888,557 | 5/1959 | Schneider | 307/225 R |
| 3,548,175 | 12/1970 | Tomlin | 307/325 |
| 2,488,297 | 11/1949 | Lacy | 328/39 |
| 2,896,092 | 7/1959 | Pugsley | 307/225 R |
| 3,140,447 | 7/1964 | Olbrych et al. | 307/225 R |
| 3,183,369 | 5/1965 | Lauer | 307/225 R |
| 3,293,561 | 12/1966 | Hegarty et al. | 307/225 R |
| 3,417,316 | 12/1968 | McCaul et al. | 307/225 R |
| 3,549,792 | 12/1970 | Barclay | 178/5.4 P |

*Primary Examiner*—Herman Karl Saalbach
*Assistant Examiner*—R. E. Hart
*Attorney*—Frank R. Trifari

[57] ABSTRACT

A signal frequency is divided by a number $m=n+j$ by means of an $n$-divider based, for example, on digital principles. The output pulses of the $n$-divider switch a monostable multivibrator which blocks an AND-gate during $j$-pulses of the input signal. The input pulses have to pass the AND-gate so that the frequency is divided by $(n+j)$. If the $n$-divider consists of various dividing stages, phase transitions occur in the signal between these dividing stages, which can be filtered out or avoided by the introduction of an auxiliary oscillator which is coupled to the first frequency by a phase-sensitive detector. The latter principle is applied in a PAL frequency divider.

5 Claims, 10 Drawing Figures

*INVENTOR.*
LEONARDUS A.J. VERHOEVEN

*BY* Frank R. Trifari
AGENT

*INVENTOR.*
LEONARDUS A.J. VERHOEVEN
*BY*
AGENT

FREQUENCY DIVIDER

The invention relates to a device for dividing signal frequencies by a number *m*, comprising an input terminal to which the signal frequencies can be applied, a loop in which are incorporated a gate circuit, a first input of which is connected to said input terminal, a divider which divides by a number *n* which is smaller than or equal to *m*, an output terminal and return line from the output terminal to a second input of the gate circuit.

Dividing devices of this kind are known. The dividers applied therein (dividing by *n*) may be bistable multivibrators and/or also monostable multivibrators. In an example of the last-mentioned divider (known from the French Patent specification No. 1,422,354) a first input pulse, the starting pulse, starts via a gate circuit (AND-gate) a monostable multivibrator, the output pulse of which blocks the AND-gate via another input of the AND-gate during the time in which a number $(j-1)$ of input pulses arrive on the first input. The next input pulse, the $(j+1)$th, can start the cycle again. In this case the input pulse frequency divided by *j* appears on the output of the AND-gate. The drawback of the device is that the constancy of *j* is threatened by instability of the monostable multivibrator, particularly in the case that *j* is high. The divider may also be designed with bistable multivibrators so that stability is ensured. In this case all values for *j* can in principle be obtained but if *n* is no power of 2, often a complicated system of feedbacks has to be designed.

The object of the dividing device according to the invention is to eliminate these objections, for which purpose it is characterized in that in the return line from the output terminal to the gate circuit at least one monostable multivibrator is incorporated which is switched by the output signals of the *n*-divider in order to block therewith the gate circuit during a number of *j* periods of the input signal so that on the output terminal an input signal frequency appears which has been divided by $m = n + j$. By a suitable choice of *j* a comparatively simple circuit arrangement may be used for the *n*-divider, because, for example, a number containing many factors 2 may be chosen for *n*.

A special property of the divider provided with a monostable multivibrator is the fact that by variation of the setting of the multivibrator the value of *m* can be varied and/or modulated in a simple manner because the value of *j* may be influenced. For this purpose a further embodiment of the dividing device according to the invention is characterized in that the pulse length $\tau$ of the monostable multivibrator can be varied in order to vary the dividing factor *j*. It is to be noted that a known embodiment in German Pat. No. 1,247,397 consists of a circuit arrangement for dividing signal frequencies by the higher prime numbers. Herein the output pulse of an *n*-divider (for example, consisting of analogue stores for pulse storage) blocks an input gate with the aid of a bistable multivibrator connected to the output of the *n*-divider. Parallel to the *n*-divider a second divider is connected which operates as a one-divider or a two-divider, depending on the nature of the prime number to be formed. This second divider also has its output connected to the bistable multivibrator. The output pulse of the second divider switches over the bistable multivibrator and opens the input gate.

A disadvantage of this dividing device is that *j* may only be 1 or 2, so that the variability of the number *n* is limited. Another drawback is that the constancy of *n* is threatened if the *n*-divider is composed of nondigital elements, namely by instability of the latter.

A particularity of the present invention occurs if the *n*-divider consists of a number of dividing stages in series. Between the dividing stages a frequency arises which with respect to the original frequency is divided by a number lower than $(n + j)$. The shape of the signal is then such that a given repetitive pattern is always interrupted during some time, which means that phase transitions are present. If these frequencies are to be used, it should be realized that these phase transitions are present and, if necessary, measures should be taken. It is possible, for example, to filter out the low-frequency component with the aid of a high-pass filter. Therefore, a further embodiment of the dividing device according to the invention is characterized in that the phase transitions occurring in the signal between the perhaps various stages of the *n*-divider are filtered out in a known manner.

The accuracy of the latter method is limited because the filtering out of the low-frequency component also affects the pulse shape. Therefore, if the accuracy is to be high, it is necessary to take other measures. Therefore, a further embodiment of the dividing device according to the invention is characterized in that an auxiliary oscillator having an auxiliary divider and a phase-sensitive detector are provided, the output frequency of the dividing device being compared in the phase-sensitive detector with the output frequency of the auxiliary divider, the latter frequency being obtained by division from the auxiliary oscillator frequency, the auxiliary oscillator being controllable by the output signal of the phase-sensitive detector so that an accurate phase relation exists between this oscillator and the signal on the input terminal of the first dividing device and hence also between the various frequencies.

Such requirements are imposed, for example, by the PAL-system for color television. Therefore, a further embodiment of the invention is proportioned as a PAL-frequency divider in which the line and picture frequencies are generated from the PAL-subcarrier frequency. As opposed to the foregoing, phase transitions as discussed in other television systems are applied here.

In order that the invention may be readily carried into effect, some embodiments thereof will now be described in detail, by way of example, with reference to the accompanying diagrammatic drawings, in which.

Figures 1, 2, 3, 4:
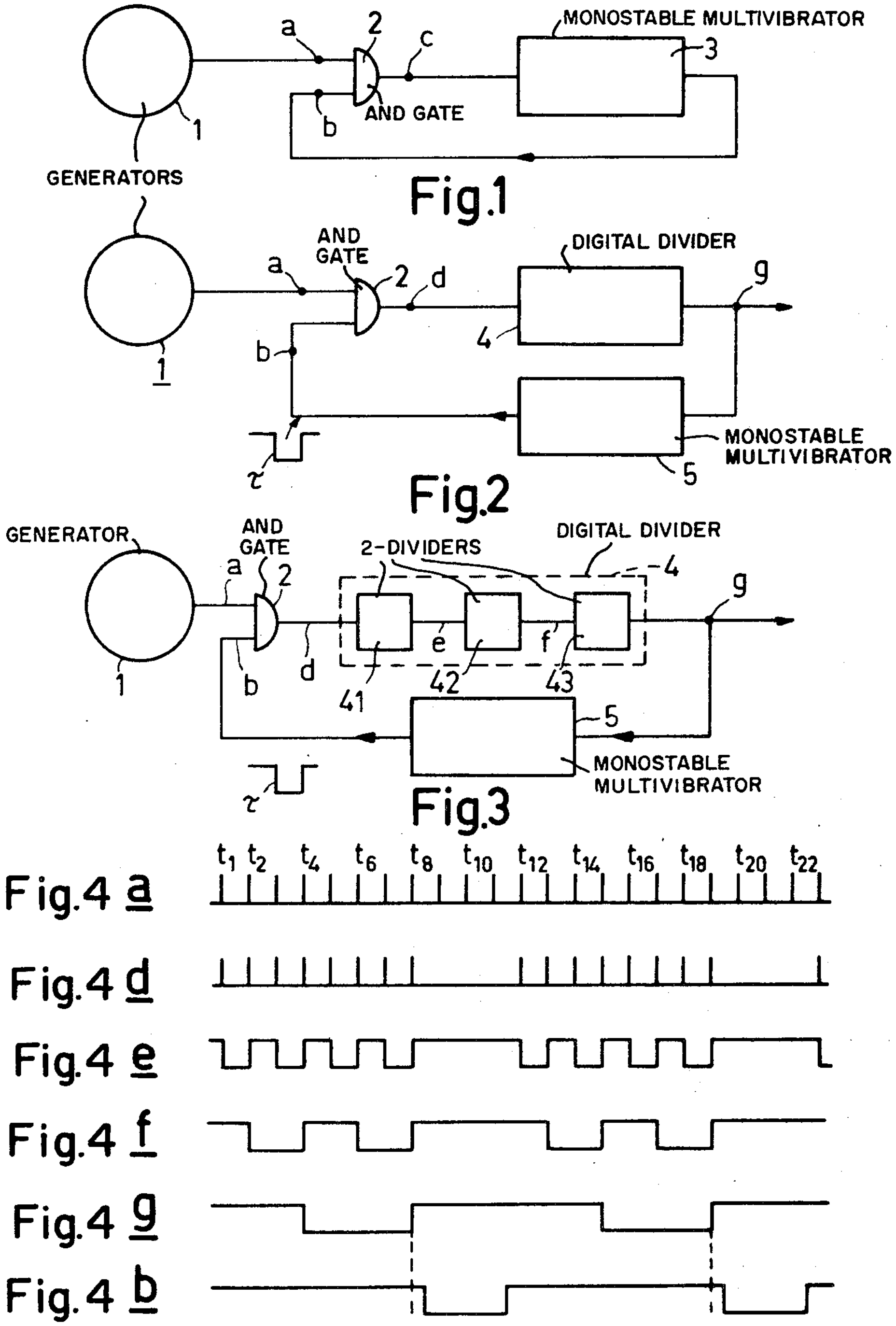
FIG. 1 shows a prior art example.
FIG. 2 shows the principle of the dividing device according to the invention.
FIG. 3 shows an example of an 11-divider according to the invention.
Figure 5:
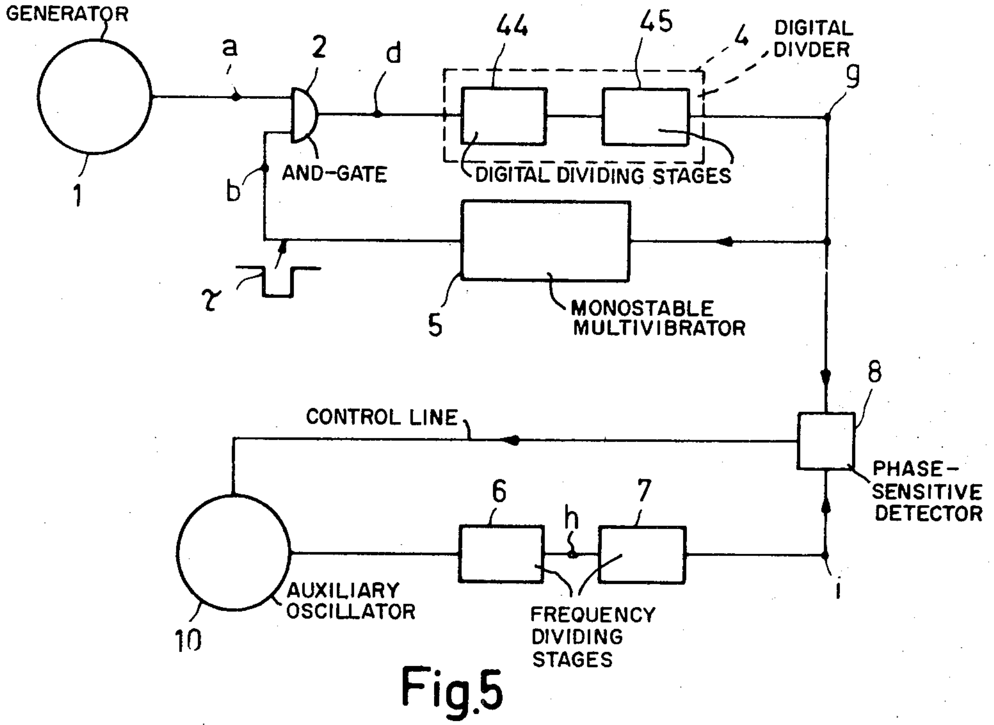

FIGS. 4*a*,*d*,*e*,*f*,*g* and *b* show the variation of the signals in the device shown in FIG. 3;

FIG. 5 shows a circuit arrangement of a further embodiment according to the invention.

The dividing device shown in FIG. 1 comprises an AND-gate 2 and a monostable multivibrator 3, the output of which is connected to an input (*b*) of the gate. In this dividing device the input pulses of a generator 1 arrive on input *a* of the gate circuit (AND-gate) 2. The first input pulse starts, via the output $c$ of the AND-gate, the monostable multivibrator 3, the output pulse of which has a length $\tau$ and blocks, via the other input $b$ of the AND-gate 2, this gate 2 during the time in which a number $(j-1)$ of input pulses arrive on the first input $a$. The next input pulse, the $(j+1)$th pulse, can then start the cycle again. In this case the input pulse frequency divided by $j$ appears on the output $c$ of the AND-gate.

The dividing device shown in FIG. 2 comprises an AND-gate 2, a divider 4 and a monostable multivibrator 5, the output of which is connected to an input ($b$) of the gate. The operation is as follows: between the points $d$ and $g$ the signal frequency is divided by $n$. Going from the starting pulse (the first pulse), the $n^{th}$ pulse switches the monostable multivibrator 5 via the divider output $g$. The output pulse of the multivibrator has a length $\tau$ and blocks via input $b$ the AND-gate 2 during the time in which $j$ input pulses arrive on the first input $a$. The $(n+j+1)$th input pulse can then start the cycle again. In this case the input pulse frequency divided by $(n+j)$ appears on the output $d$ of the AND-gate.

FIG. 3 shows an embodiment of an 11-divider in which the $n$-divider 4 consists of three 2-dividers (41, 42 and 43) in series and a monostable multivibrator 5 for $j=3$ in the feedback line. For different places in the circuit the variation of the signal with the time is shown in FIG. 4. The pulses of the generator 1 arrive at $a$ at regular intervals. Starting with the first input pulse at the instant $t_1$ the frequency is each time divided by 2 in the divider 4 in a known manner until at the instant $t_8$ the first output pulse of the dividing stage 43 switches the multivibrator 5. The latter blocks the AND-gate between the instants $t_8$ and $t_{12}$. At the instant $t_{12}$, however, the pulse then arriving can start the cycle again.

It is obvious that phase transitions occur at the points $d$, $e$ and $f$, and that when these intermediate frequencies are used it should be realized that these phase transitions are present. Therefore, if a constant frequency is desired additional measures must be taken. This may be effected with a filter of a known type which, for example, filters out the low-frequency component of the signal.

FIG. 5 shows a further embodiment according to the invention. The dividing device is composed as that of FIG. 3, having an $n$-divider 4 which is composed of two dividing stages 44 and 45. The output frequency at $g$ is applied to a phase-sensitive detector 8. The latter compares this signal with a second signal which is formed by dividing the frequency of the signal of an auxiliary oscillator 10 in a known manner in the dividing stages 6 and 7. The output signal of the phase-sensitive detector 8 is used to control the oscillator 10 so that the signals present at $g$ and $i$ have accurately the same phase. The various frequencies are then also accurately coupled to each other. A dividing device of this kind can be applied, for example, in a PAL-television system. In that case three frequencies occur, viz. the PAL subcarrier frequency $f_{PAL}$ (approximately 4.4 MHz), the line frequency $f_L$ (approximately 16 kHz) and the picture frequency $f_B$ (approximately 50 Hz).

The relationship between the three digital frequencies is as follows:

$$f_B = (f_{PAL}/283.75 \times 625 + 1)$$

$$f_{PAL} = 283.75 \times 625\, f_B + f_B = 283.75\, f_L + f_B.$$

In this case the following dividing factors are found: dividing stage 44: 283.75; dividing stage 45: 625; dividing stage 7: 625. Oscillator 10 and dividing stage 6 together produce the line frequency, for example because for 10 a frequency of approximately 126 kHz is chosen which is divided in the dividing stage 6 by a factor 8. This is a known system of generating frequencies in this range. The monostable multivibrator 5 supplies a pulse having a length of 226 ns so that $j$ obtains the value 1. The line frequency is thus present in the point $h$ and the picture frequency is present in the points $g$ and $i$. Due to this design the cumbersome 25 Hz single-sideband modulator which was usually used until now is avoided (Literature Telefunken Zeitung 1963, Heft 1/2, p.92).

What is claimed is:

1. A device for dividing signal frequencies by a number $m$, comprising an input terminal for receiving signal frequencies to be divided, an AND-gate having a first input connected to the input terminal of the device, a digital divider having a division ratio of $n$, $n$ being smaller than $m$, means for connecting an input of the digital divider to an output of the AND-gate, and delay means comprising a monostable multivibrator having an input connected to the output of the digital divider and having an output connected to an input of the AND-gate for providing an enabling level to the AND-gate wherein pulses from the input terminal pass through the AND-gate to the digital divider and for providing the AND-gate with a blocking pulse having a duration of $j$ periods of the input signal in response to an output of the digital divider, whereby the output frequency of the digital divider, $j$ being a non-zero integer, is divided by a number $m=n+j$.

2. A dividing device as claimed in claim 1, characterized in that the pulse length $\tau$ of the monostable multivibrator is variable for varying the dividing factor $j$.

3. A dividing device as claimed in claim 1, characterized in that the phase transitions which occur in the signal which is present between the various stages of the digital divider are filtered.

4. A dividing device as claimed in claim 1, further comprising an auxiliary oscillator having an auxiliary divider and a phase-sensitive detector, the output frequency of the dividing device being compared in the phase-sensitive detector with the output frequency of the auxiliary divider, the latter frequency being obtained by division from the auxiliary oscillator frequency, the auxiliary oscillator being controllable by the output signal of the phase-sensitive detector so that an accurate phase relation exists between this oscillator and the signal on the input terminal of the first dividing device, and hence also between the various frequencies.

5. A dividing device as claimed in claim 4, constructed as a PAL frequency divider in which the line and picture frequencies are generated from the PAL-frequency.

* * * * *